US009713809B2

(12) United States Patent
Chaudret et al.

(10) Patent No.: US 9,713,809 B2
(45) Date of Patent: Jul. 25, 2017

(54) CHEMICAL METHOD CATALYSED BY FERROMAGNETIC NANOPARTICLES

(71) Applicants: INSTITUT NATIONAL DES SCIENCES APPLIQUEES DE TOULOUSE, Toulouse (FR); CENTRE NATIONAL DE LA RECHERCHE SCIENTIFIQUE (CNRS), Paris (FR); UNIVERSITE PAUL SABATIER TOULOUSE III, Toulouse (FR)

(72) Inventors: Bruno Chaudret, Vigoulet Auzil (FR); Julian Carrey, Toulouse (FR); Pier Francesco Fazzini, Toulouse (FR); Vinciane Kelsen, Toulouse (FR); Sebastien Lachaize, Gensac de Boulogne (FR); Anca Meffre, Blagnac (FR); Boubker Mehdaoui, Toulouse (FR); Marc Respaud, Calmont (FR)

(73) Assignees: INSTITUT NATIONAL DES SCIENCES APPLIQEES DE TOULOUSE, Toulouse (FR); CENTRE NATIONAL DE LA RECHERCHE SCIENTIFIQUE (CNRS), Paris (FR); UNIVERSITE PAUL SABATIER TOULOUSE III, Toulouse (FR)

( * ) Notice: Subject to any disclaimer, the term of this patent is extended or adjusted under 35 U.S.C. 154(b) by 0 days.

(21) Appl. No.: 14/781,632

(22) PCT Filed: Apr. 2, 2014

(86) PCT No.: PCT/FR2014/050786
§ 371 (c)(1),
(2) Date: Oct. 1, 2015

(87) PCT Pub. No.: WO2014/162099
PCT Pub. Date: Oct. 9, 2014

(65) Prior Publication Data
US 2016/0023201 A1  Jan. 28, 2016

(30) Foreign Application Priority Data
Apr. 2, 2013 (FR) ...................................... 13 52961

(51) Int. Cl.
*C10G 2/00* (2006.01)
*B01J 23/89* (2006.01)
*B01J 35/00* (2006.01)
*B01J 23/745* (2006.01)
*B01J 27/22* (2006.01)

(52) U.S. Cl.
CPC ......... *B01J 35/0033* (2013.01); *B01J 23/745* (2013.01); *B01J 23/8906* (2013.01); *B01J 27/22* (2013.01); *B01J 35/0013* (2013.01); *C10G 2/332* (2013.01); *C10G 2/333* (2013.01)

(58) Field of Classification Search
CPC ... C10G 2/332; B01J 23/8906; B01J 35/0033; B01J 23/745; B01J 27/22; B01J 35/0013
See application file for complete search history.

(56) References Cited

U.S. PATENT DOCUMENTS

2012/0024691 A1* 2/2012 Gogichev ........... B01F 13/0809
204/155

OTHER PUBLICATIONS

International Search Report, dated Jul. 7, 2014, from corresponding PCT application.
Vinciane Kelsen et al., "The use of ultrasmall iron(0) nanoparticles as catalysts for the selective hydrogenation of unsaturated C—C bond", Chemical Communications, Jan. 1, 2013, p. 3416, vol. 49, No. 33.
Sascha Ceylan et al., "Inductive Heating for Organic Synthesis by Using Functionalized Magnetic Nanoparticles Inside Microreactors", Angewandte Chemie International Edition, Nov. 3, 2008,m pp. 8950-8953.
Thomas K. Houlding et al., "Application of alternative energy forms in catalytic reactor engineering", Green Processing and Synthesis, Jan. 1, 2012, pp. 19-31, vol. 1, No. 1.

* cited by examiner

*Primary Examiner* — Jafar Parsa
(74) *Attorney, Agent, or Firm* — Young & Thompson

(57) ABSTRACT

A method for the heterogeneous catalysis of a chemical reaction using, in a reactor, at least one reagent and a catalytic composition that can catalyze the reaction within a given range of temperatures T. At least one reagent is brought into contact with the catalytic composition which includes a ferromagnetic nanoparticulate component whose surface is formed at least partially by a compound that is a catalyst for the reaction; the nanoparticulate component is heated by magnetic induction in order to reach a temperature within the range of temperatures T; and the reaction product (s) formed on the surface of the nanoparticulate component are recovered. A catalytic composition includes a ferromagnetic nanoparticulate component that can be heated by magnetic induction to the reaction temperature, whose surface thereof is at least partially formed by a catalyst compound for the reaction. The catalyst is heated by the effect of the magnetic field.

14 Claims, 4 Drawing Sheets

CHEMICAL METHOD CATALYSED BY FERROMAGNETIC NANOPARTICLES

The present invention belongs to the field of heterogeneous catalysis processes and more particularly of processes for chemical conversions catalyzed by metal nanoparticles.

One subject of the present invention is a catalytic composition comprising nanoparticles that combine magnetic and catalytic properties, which are capable of catalyzing a chemical reaction when they are heated by a magnetic field. Another subject of the present invention is a process for the heterogeneous catalysis of a chemical reaction where a reactant is brought into contact with such a catalytic composition, which is heated by magnetic induction in order to reach the desired temperature.

The studies leading to the present invention benefited from financial support from the Seventh Framework Programme of the European Community (7th PC/2007-2013) by virtue of ERC grant agreement no. 246763.

It is known that almost 80% of the processes that the chemical industry has carried out use heterogeneous catalysis. For example, the conversion of coal or natural gas into higher value-added products requires the use of catalysts. The refining industry would not have experienced the current boom without the discovery of catalysts for cracking hydrocarbons for the production of gasolines. A better formulation and a better composition of the gasolines (better octane number) have been made possible following the development of catalysts for the isomerization and aromatization of paraffins. The catalytic processes thus developed in the refining industry have had a considerable impact, both on the economy and on the better use of the raw materials. Another example of the dynamics generated by catalysis in our society is provided by the industrial preparation of ammonia from nitrogen from the air and hydrogen, catalyzed by mineral compounds such as iron, which has had considerable effects on agriculture by contributing to the development of mineral fertilizers.

By substantially increasing the rate of the chemical conversions and by improving the selectivity of the reaction towards the desired product, catalytic processes have made it possible to considerably increase the production capacity of industrial units and to decrease the dimensions of the production units. However, these reactions, which take place at high temperature, consume large amounts of energy.

Nowadays, research is continuing in order to further improve the efficiency of industrial heterogeneous catalysis processes, and this is within a context that imposes new constraints dictated by economic factors and legislative provisions that target in particular the safety of the equipment and compliance with environmental standards. Among these constraints, mention will be made of lower energy use, the upgrading or use of by-products, the choice of raw materials and pollution control.

The twelve principles of Green Chemistry which, as a consequence of the awareness of researchers, and more broadly of civil society, for the need to protect our planet, recommend favoring catalytic processes to stoichiometric processes, with the search for new more efficient and safer reactants. Processes that have a reduced energy impact should also be encouraged. It is therefore advisable to seek processes that have a low energy consumption: autothermal processes, operating at low pressures and/or at low temperatures.

The choice of a more efficient catalyst may constitute one solution. Mention may be made, in the field of homogeneous catalysis, of the example of hydroformylation, where the replacement of cobalt complexes by rhodium complexes has led to a reduction in the reaction pressure and temperature, improved the selectivity and eliminated the cycle for the treatment of the catalyst. However, the energy savings remain moderate, since the reaction temperatures in homogeneous catalysis are moderate, of the order of 100° C. to 150° C. in the presence of a solvent. Above all, the solution proposed cannot be generalised to other reactions. It is not suitable in particular for reactions with gaseous compounds, such as carbon oxides.

The fact remains that most chemical catalysis processes require a significant energy input, this being for several reasons. The first is that the reactions take place at high temperatures, within a range of the order of 300° C. to 500° C. as regards heterogeneous catalysis reactions. The rise in temperature of the reactors must be gradual, to avoid causing the degradation of the catalyst, by aggregation or fusion of particles, or calcination. Moreover, considering the various industrial constraints, these reactions require large-sized conversion units, the start-up of which is long, and the temperature hold of which consumes a great deal of energy.

It would therefore be advantageous to develop a process of general scope, which makes it possible to greatly reduce the amount of energy needed for a given reaction. Ideally, such a process and its operating procedure should be applicable to numerous catalytic reactions, or even to most of them.

In order to satisfy this objective, the inventors have researched a means for obtaining a heating of a reaction medium that is rapid but sufficient to carry out the catalytic reaction. The innovative solution is based on the use of ferromagnetic catalysts, which can be heated by magnetic induction using a field inductor external to the reactor. In this system, a catalytic nanoparticle is heated by its own magnetic moment. Only the catalyst is heated. Under the effect of the magnetic field, its temperature rises rapidly so that the catalysis reaction starts at its surface, without the reaction medium in its entirety having reached the critical reaction temperature. It is thus possible to achieve very high local temperatures.

Within the context of the present invention and in a novel manner, catalytic materials are proposed that combine physical properties and chemical properties, namely that they can simultaneously act as a catalyst for a given reaction, and be stimulated in order to provide the thermal energy necessary for said reaction. These are nanoparticles that have both a catalytic action in one or more chemical reactions, and ferromagnetic properties so that they react by local and point heating when an alternating field of radiofrequencies is applied thereto, giving rise to the catalytic reaction of the reactants that are in contact therewith.

Magnetic nanoparticles (MNPs) are known for having advantageous properties that find applications in various fields such as permanent magnets, microelectronics and nanoelectronics, "green" catalysis or biomedicine. The treatment of cancers by magnetic hyperthermia is particularly promising: MNPs are injected into the tumor, then the patient is immersed in a magnetic field of chosen frequency and amplitude. Due to the excitation of the MNPs, the temperature of the tumor increases, improving the effects of the chemotherapy (for temperatures of 42-45° C.), or even leading to the necrosis of the tumor (T°>50° C.).

Numerous studies aim to optimize medical treatments via hyperthermia. Indeed, the search for MNPs that have optimal properties in this challenging field and the development of conditions for the synthesis thereof is very active (*Optimal size of nanoparticles for magnetic hyperthermia: A*

*combined theoretical and experimental study*. B. Mehdaoui, A. Meffre, J. Carrey, S. Lachaize, L. M. Lacroix, M. Gougeon, B. Chaudret, and M. Respaud, Adv. Funct. Mat. 2011, 21, 4573—*Alternative and Robust Synthesis of Monodisperse Iron(0) Nanoparticles With High Magnetization*: Anca Meffre, Sébastien Lachaize, Christophe Gatel, Marc Respaud and Bruno Chaudret, J. Mat. Chem. 2011, 21, 13464—*A simple chemical route toward monodisperse iron carbide nanoparticles displaying tunable magnetic and unprecedented hyperthermia properties*: Anca Meffre, Boubker Mehdaoui, Vinciane Kelsen, Pier Francesco Fazzini, Julian Carrey, Sebastien Lachaize, Marc Respaud, Bruno Chaudret, NanoLetters, 2012).

However, considering the specificity of the medical field, the results obtained are difficult to transpose to an environment such as that of chemical catalysis. In fact, the temperatures involved are different, since in order to protect biological tissues it is imperative to work at maximum temperatures of 50° C. to 60° C., with short durations, whereas the catalytic conditions will impose values generally greater than 300° C. and operating conditions that are often harsh.

Moreover, although hyperthermia (this term being reserved to date for therapeutic applications) uses nanoparticles endowed with magnetic properties, sometimes combined with optical properties in order to aid in the locating thereof in the organism, these nanoparticles are inert with respect to their medium and do not play a catalytic role. It is not therefore possible to use the same nanoparticles in both cases.

Unexpectedly, it has appeared that a reaction catalyzed by an MNP, the surface of which comprises a catalyst for said reaction, was able to start up in less than one second when a magnetic field is applied, and that it continued with a minimal energy input, until a conversion that may be complete. One particularly advantageous consequence of the almost instantaneous rise in temperature is that the reaction may be more easily controlled. It may be carried out with great flexibility, in reactors of small size. Since its start-up is rapid, it may be stopped and restarted without major (economic or technical) drawbacks. It may easily be stimulated intermittently, which is an advantage when it is desired to avoid the runaway of an exothermic reaction, especially as, since the rise in temperature is localized at the catalyst, the reaction volume is not as hot as the catalyst and therefore has a lower thermal inertia than in a conventional system.

It is also a notable advantage when a substrate of the reaction is provided sequentially or irregularly to the reactor. This is the case, for example, for the hydrogen produced from photovoltaic or wind energy. A specific feature of this type of energy is that it is produced by a multitude of dispersed sources, of low or moderate power, operating intermittently. It is therefore crucial to be able to store it in a readily transportable and transformable form, in order to use it in a regular manner.

One well-known process for storing energy is the catalytic reduction of carbon oxides to hydrocarbons: in the presence of hydrogen, carbon dioxide ($CO_2$) is converted into methane (Sabatier reaction) and carbon monoxide (CO) into higher hydrocarbons (Fischer-Tropsch process). The catalysts here are metals such as iron, cobalt, nickel or alloys of these metals. The advantage of these chemical processes is to produce methane or a mixture of hydrocarbons which can then be hydrocracked (hydroisomerized) to provide synthetic liquid fuel.

However, currently, the chemical conversion of carbon oxides requires conversion units of large size which have a high inertia since the heating time of the equipment is long. This excludes the supply thereof by intermittent and low-power energy sources.

The present invention therefore provides a particularly advantageous solution to these challenges by proposing a process for gas-solid heterogeneous catalysis that enables the hydrogenation of carbon oxides using ferromagnetic and catalytic nanoparticles.

This process thus makes it possible to convert dihydrogen into another chemical form, and therefore to convert the electrical energy produced locally into energetic compounds, such as hydrocarbons, that can be directly used in thermal systems. It is suitable for industrial imperatives, since it may be carried out in units of small size with adjustable operation, and advantageously in a decentralized manner.

A process is thus proposed for carrying out a heterogeneous catalytic reaction, using a catalytic composition comprising NPs endowed with both catalytic and magnetic properties. More specifically, one subject of the invention is a process for the heterogeneous catalysis of a chemical reaction using, in a reactor, at least one reactant and a catalytic composition capable of catalyzing said reaction in a given range of temperatures T, in which process said at least one reactant is brought into contact with said catalytic composition, which composition comprises a ferromagnetic nanoparticulate component, the surface of which consists, at least partly, of a compound that is a catalyst for said reaction, said nanoparticulate component is heated by magnetic induction in order to reach a temperature within said range of temperatures T, and the reaction product(s) that are formed at the surface of said nanoparticulate component are recovered.

The nanoparticles used in the process that is the subject of the invention are therefore species endowed with both ferromagnetic and catalytic properties. They may form the catalytic composition by themselves, or form only a fraction thereof.

The term "inductor" denotes globally a magnetic induction system comprising members that generate the magnetic field, members that make it possible to control the values of this field, and also the power supply or other supply, that a person skilled in the art knows how to select and calibrate with regard to the given specifications, and that will be specified further on. The inductor is arranged so that the reaction mixture, and especially the catalytic composition, is subjected to the magnetic field when it is started up. The magnetic field may for example be generated from a device placed in the reactor, in its wall, or else outside the reactor. The latter embodiment will be preferred since the inductor is thus separated from the potentially harsh chemical environment. Moreover, in this case, the inductor can be more easily controlled. Thus, in the process according to the invention, the nanoparticulate component may be heated by magnetic induction using a field inductor external to the reactor.

The generation of high-frequency magnetic fields is relatively energy-expensive since the power needed increases with the square of the field applied. On the other hand, the heat dissipated by optimized particles increases linearly with the value of the field. It will be preferred to work at low magnetic field values for a better energy efficiency. This is why, according to one advantageous feature of the process according to the invention, the magnetic field generated has an amplitude of between 1 mT and 100 mT (which corresponds to low field values), and a frequency of between 20 kHz and 400 kHz. It is possible to work at even lower values, with a magnetic field having an amplitude that may range from 20 mT to 80 mT, and a frequency of from 50 kHz to 300 kHz.

The catalytic composition comprises a ferromagnetic and catalytic nanoparticulate component. The ferromagnetic nanoparticulate component may be endowed, by itself, with properties that are catalytic with respect to the reactants involved. In this case, according to one variant of the process that is the subject of the invention, said nanoparticulate component consists of at least one ferromagnetic metal compound which is also a catalyst for said reaction.

Use may also be made, in the catalytic composition, of ferromagnetic nanoparticles that are not catalysts for the reaction in question. It is then provided for a catalyst compound to be combined with ferromagnetic nanoparticles, this compound very obviously being, in this case, different from the magnetic material. Thus, in one alternative variant of the process that is the subject of the invention, said ferromagnetic nanoparticulate component forming a core is associated with a metal that is catalytic for said reaction. The catalytic metal may simply cover (at least partly) the ferromagnetic material. It may also be added to the particles of magnetic material so as to form a homogeneous alloy with the base magnetic metal. One then has a homogeneous or segregated species containing the two elements, endowed with the twofold property of being ferromagnetic and catalytic for said reaction. For the simplicity of the description, reference will be made subsequently to core and covered surface, although for some of the particles according to the invention, this distinction is more functional than physical.

Since an objective of the invention is to save energy, it is desired that the nanoparticles used have an optimized heating power, that is to say that their rise in temperature be maximal for a given magnetic field (and therefore also their energy efficiency). This is the case when the anisotropy of the material corresponds to the following relationship between the anisotropy of the material, the magnetization thereof, and the magnetic field applied:

$$K = 1.69 \frac{\mu_0 H_{ac} M_S}{2},$$

where K is the anisotropy of the material, $M_S$ the magnetization and $\mu_0 H_{ac}$ the alternating field applied (*Simple models for dynamic hysteresis loop calculations of magnetic single-domain nanoparticles: Application to magnetic hyperthermia optimization*—J. Carrey, B. Mehdaoui and M. Respaud J. Appl. Phys. 109, 083921 (2011)). Working with weak magnetic fields therefore involves using nanoparticles with low anisotropy.

This is why, for a given magnetic field, the amplitude of which may range from 20 mT to 80 mT—advantageous for the targeted industrial application—it is preferable to work with materials having an anisotropy that is less than $8 \times 10^4$ J/m$^3$, and ideally less than $3 \times 10^4$ J/m$^3$. The materials that are included in this category are, for example, Fe, FeCo, iron oxides (magnetite, maghemite), nickel, permalloy, soft ferrites, carbides, amorphized magnetic materials, etc. Thus, according to one preferred feature of the process which is a subject of the invention, said ferromagnetic metal compound is selected from those which have a magnetic anisotropy of less than $8 \times 10^4$ J·m$^{-3}$, and more preferably less than $3 \times 10^4$ J·m$^{-3}$.

Still from the point of view of the heating power and according to the invention, it is advantageous to also optimize another parameter, namely the size of the nanoparticles, commonly defined by their diameter. The size must be as large as possible, at least for as long as the nanoparticles remain single-domain nanoparticles, that is to say have a size smaller than the critical size for transition between the single-domain state and the multi-domain state. The transition to a multi-domain state for the large particles is in fact accompanied by a drop in their heating power (*Optimal size of nanoparticles for magnetic hyperthermia: A combined theoretical and experimental study*—B. Mehdaoui, A. Meffre, J. Carrey, S. Lachaize, L. M. Lacroix, M. Gougeon, B. Chaudret, and M. Respaud—Adv. Func. Mater. 21, 4573 (2011)).

Although this optimal size is difficult to predict exactly, the inventors have been able to establish that it must be proportional to $$\sqrt{\frac{T_C}{K}},$$

where K is the anisotropy of the material and $T_C$ is the Curie temperature of the material. It was found experimentally to be approximately 20 nm in the case of iron (B. Mehdaoui, ibid.). Using the K and $T_C$ values of iron, it has been deduced that the optimal diameter D in nanometers is around:

$$D = 135 \sqrt{\frac{T_C}{K}},$$

with $T_C$ in kelvins, and K in Jm$^{-3}$. This is why, preferably, in order to maximize the heating power in the process according to the invention, the size of said ferromagnetic nanoparticulate component is such that its diameter D, expressed in nanometers, is defined by the relationship:

$$D = N \sqrt{\frac{T_C}{K}}$$

where N is such that $80 \leq N \leq 200$, and $T_C$ is the Curie temperature of the ferromagnetic material of said nanoparticulate component in kelvins, and K is its magnetic anisotropy in Jm$^{-3}$. More preferably, the value of N is such that $110 \leq N \leq 160$.

It is specified that the diameter D is defined strictly as relating to the size of the magnetic portion of the particle (the whole nanoparticle or only the core, depending on the case). In practice, the fact of covering the core with another material does not significantly change the data insofar as there is no chemical reaction between the catalyst and the core which modifies the surface magnetism of the particle. This is even truer as the particles of optimal size are in general relatively large, so that an optional modification of the surface magnetism has no discernible influence on the particle in its entirety. Finally, use will advantageously be made, in the process according to the invention, of a ferromagnetic nanoparticulate component having a size of between 5 nm and 50 nm.

According to one particular feature of the process that is the subject of the invention, when said at least one metal compound is both ferromagnetic and catalyzing, it may be selected from iron, cobalt, nickel, and oxides, carbides and alloys of these metals. For example, the following materials which have an anisotropy of less than $8 \times 10^4$ J·m$^{-3}$ may be selected: Fe, FeCo, iron oxides (magnetite, maghemite), amorphous carbides and Fe/Cx alloys, for example $Fe_3C$, $Fe_5C_2$. Mention may also be made of NiFe alloys (for example permalloy), soft ferrites (ferromagnetic ceramics based on iron oxides, for example MnZn or NiZn ferrites), or else amorphized magnetic materials, etc.

According to an alternative feature of the process that is the subject of the invention, when said at least one ferromagnetic metal compound forms a core covered with a catalytic metal, the ferromagnetic metal compound may be selected from iron and iron carbides, and said catalytic metal completely or partly covering it may be selected from ruthenium, manganese, cobalt, nickel, copper and zinc. Preferably, use will be made of ruthenium or cobalt for their excellent catalytic properties.

It is noted that there is no obligation for the catalytic metal to cover the ferromagnetic compound completely insofar as no particular protection of the ferromagnetic material with respect to the reaction medium (or vice versa) is sought or necessary. Therefore, it is of little importance whether the covering is complete or partial.

In accordance with the present invention, the process is carried out in a reactor which is manufactured from non-ferromagnetic materials. Use may in particular be made of glass, silicon and polymer materials such as a polycarbonate, a polyester or a polytetrafluoroethylene (PTFE, known under the trade name Teflon).

The process that has just been described is based on the principle of the use of induction heating for heating catalysts based on ferromagnetic metals for very varied conversions. In the case where the catalysts are not themselves ferromagnetic, they may be supported on iron carbide, iron-cobalt carbide or other nanoparticles. It has a very broad scope, since it may be carried out for numerous conventional catalytic reactions that are the subject of large-scale industrial exploitation, for example in the field of fine chemistry or synthesis of ammonia. The implementation thereof requires only an alternating magnetic field generator, an inexpensive device, and equipment made of glass or polymers. The whole process may be carried out very simply at a reduced cost.

The process makes it possible to locally attain very high temperatures in the solutions that are otherwise not heated. Therefore, it is particularly suitable for second-generation biomass conversion reactions (conversion of lignocellulosic residues). The use of iron makes the process completely "green".

The process according to the invention may be applied to any type of chemical reaction, using a solid catalyst and reactants in the gaseous or liquid state. It is particularly advantageous for carrying out the conversion of gaseous compounds (gas-solid heterogeneous catalysis), such as a reaction for synthesizing a hydrocarbon (or hydrogen-containing organic compound). It may be, for example, a Sabatier reaction, a Fischer-Tropsch synthesis, a methanization reaction, or the synthesis of methanol or higher alcohols. More particularly, the process according to the invention may advantageously be applied to a hydrogenation reaction of a carbon oxide in the gaseous state (CO, $CO_2$), catalyzed by ferromagnetic and catalytic nanoparticles heated by magnetic induction.

The catalytic compositions that make it possible to carry out the processes that have just been described contain nanoparticulate compounds having the twofold distinctive feature of being ferromagnetic and of being catalysts for a reaction of interest. There is thus an association, on one and the same material, of physical (magnetism) and chemical (catalysis) properties. Complementary functionalities ensue therefrom, which are benefited from here in an original manner, in a completely novel application.

In order to be suitable for use in these innovative processes, the nanoparticulate compounds must meet a certain number of criteria. In particular, it is necessary to control the synthesis of ferromagnetic nanoparticles in order to give them the desired characteristics in terms of heating rate and power and also of reactivity, in order to obtain the desired catalytic effect. This is why another subject of the present invention is a catalytic composition intended to catalyze a chemical reaction in a given range of temperatures T, said reaction using, in a reactor provided with a magnetic field inductor, at least one reactant, the composition comprising a ferromagnetic nanoparticulate component, the surface of which consists, at least partly, of a compound that is a catalyst for said reaction, said component being capable of being heated by magnetic induction at a temperature within said range of temperatures T.

As explained above in detail, this ability to attain the temperatures used in heterogeneous catalysis involves that the nanoparticles remain single-domain nanoparticles, that is to say have a size smaller than the critical size for transition between the single-domain state and the multi-domain state. The transition to a multi-domain state for the large particles is in fact accompanied by a drop in their heating power.

According to the invention, it is possible to prepare nanoparticles from materials that have, by themselves, the twofold magnetic and catalytic property with respect to given reactants. In this case, it is possible to prepare a composition, the nanoparticulate component of which is of uniform structure. Thus, in one advantageous embodiment of the catalytic composition according to the invention, the nanoparticulate component consists of at least one ferromagnetic metal compound which is also a catalyst for said reaction.

It is also possible to prepare nanoparticles from materials that have only one of the required properties. In this case, it will be chosen to associate two materials (at least) so that one of the two, possessing the desired catalytic properties, is at the periphery of the nanoparticles, in contact with the reactants, whilst another, constituting a core (which may or may not be in contact with the reactants), provides its ferromagnetic characteristics. This is why, in another advantageous embodiment of the composition according to the invention, the nanoparticulate component consists of at least one ferromagnetic metal compound that forms a core, which is associated with a catalytic metal for said reaction. This variant assumes that the surface material is different from that of the core. The nanoparticles are then structured. As indicated above, the association of the two materials may be a surface addition which surface is then covered at least partly by the catalytic metal (segregated materials), or else a homogeneous alloy.

It should be noted that when the catalytic activity of the material present at the surface of the nanoparticulate compound is judged to be insufficient, it is possible to effectively reinforce it by doping with another catalytic metal. This surface doping may be used in the two variants above. For the structured nanoparticles, more than two materials may therefore be used. For example, it is possible to resort to a surface material consisting of a first metal having more or less pronounced catalytic properties, doped by a second catalytic metal (such as in particular ruthenium or cobalt).

Whatever it be, and whatever the catalytic materials chosen, care will be taken to preferably select those for which the temperature reached in the target reaction is optimal. It has been seen that, in order for the rise in temperature to be maximal (and therefore also the energy efficiency), the anisotropy of the particles must be low. This is valid for a given magnetic field, knowing that it is desired that it itself be as low as possible. This is why a ferromagnetic metal compound will be chosen that has a magnetic anisotropy of less than $8 \times 10^4$ J·m$^{-3}$. More preferably, the anisotropy of the material will be less than $3 \times 10^4$ J·m$^{-3}$.

It has also been seen that the temperature that the nanoparticles are capable of reaching also depends on their size. It will therefore be highly advisable, within the context of the invention, for the size of the particles, defined by their diameter, to approach an optimal value in connection with their magnetization, and the magnetic field applied. Thus, according to another preferred feature of the composition according to the invention, the size of said ferromagnetic nanoparticulate component is such that its diameter D, expressed in nanometers, is defined by the relationship:

$$D = N\sqrt{\frac{T_C}{K}}$$

where N is such that: $80 \leq N \leq 200$, and preferably $110 \leq N \leq 60$, and $T_C$ is the Curie temperature of the ferromagnetic material of said nanoparticulate component in kelvins, and K is its magnetic anisotropy in J·m$^{-3}$.

Thus, in the composition according to the invention and considering the preferred features disclosed above, the size of the ferromagnetic nanoparticulate component will be between 5 nm and 50 nm.

According to one particular embodiment of the composition according to the invention, when said at least one metal compound is both magnetic and catalyzing, it may be selected from iron and cobalt and alloys and compounds of these metals (metal oxides and carbides). Mention may be made, by way of example, of iron, nickel, FeCo or NiFe alloys, iron oxides such as magnetite or maghemite, amorphous carbides, borides and Fe/Cx alloys, or else soft ferrites, for example MnZn or NiZn ferrites, or else amorphized ferromagnetic materials, etc.

According to another embodiment of the composition according to the invention, when use is made of structured nanoparticles, said at least one ferromagnetic metal compound that forms a core may be selected from iron and iron carbides, and said catalytic metal completely or partly covering it may be selected from ruthenium, manganese, cobalt, nickel, copper and zinc. Preferably, use will be made of ruthenium or cobalt as surface catalytic metal.

The present invention will be better understood, and details relating thereto will appear, owing to the description which will be given of embodiment variants, in connection with the appended figures, in which.

EXAMPLE 1

Reactor for Gas-Solid Heterogeneous Catalysis Process

Figure 1:
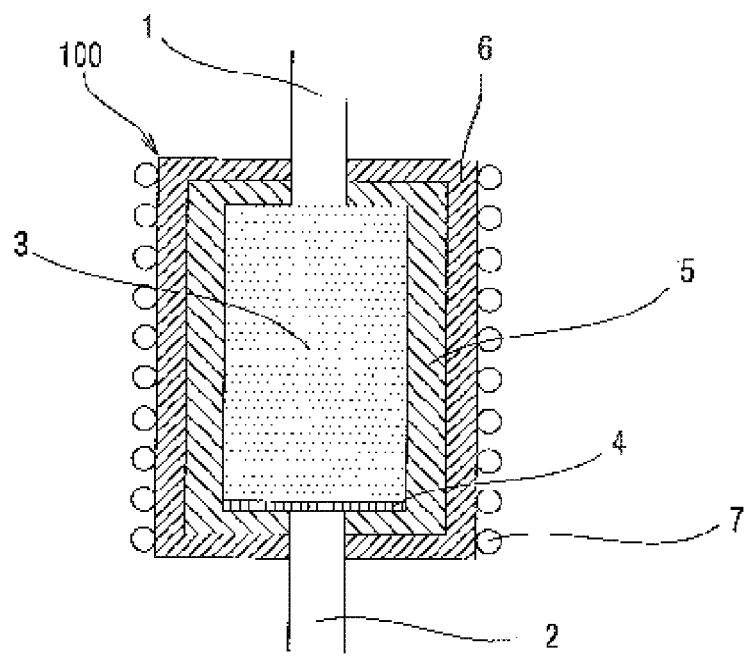
FIG. 1 is a simplified diagram of a catalysis reactor according to the invention.

The process for catalysis of a chemical reaction according to the invention may be carried out in a furnace using at least one gaseous reactant, and a catalytic composition according to the invention. The furnace presented in FIG. 1 comprises a chamber (100), comprising an inlet (1) for reactant gases and an outlet (2) for produced gases. The chamber comprises an inner wall (5) formed from a pressure-resistant, non-magnetic, chemically inert material that is preferably electrically insulating (glass, ceramic, plastic), and preferably also a thermally insulating outer wall (6). The chamber is provided with a system for generating an electric field such as a coil (7), or an electromagnet.

The chosen catalytic ferromagnetic composition (3) is introduced into the chamber. It is retained at the outlet by the grid (4) that allows the passage of the gases, but not of the nanoparticles that form said composition.

EXAMPLE 2

Synthesis of an Fe(0) Nanoparticulate Catalyst

Figure 2:
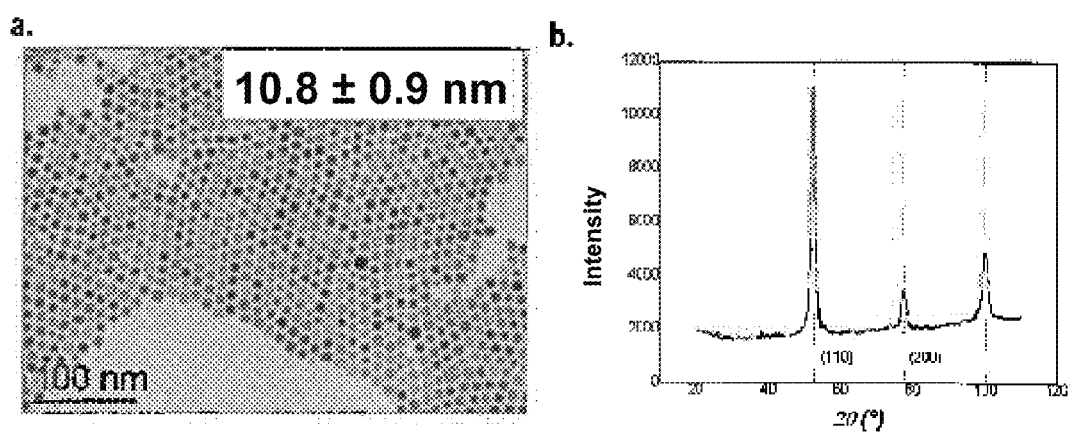
FIG. 2 shows iron nanoparticles according to the invention seen by transmission electron microscopy (FIG. 2a) and x-ray diffraction (FIG. 2b).

A glass Fisher-Porter bottle was used as reactor. It is loaded in a glovebox with a solution of 376.5 mg (1 mmol) of $\{Fe[N(SiMe_3)_2]_2\}_2$ iron complex dimer in 20 ml of mesitylene. Added to this solution are 415.5 mg (i.e. 1.5 mmol) of HDAHCl (hexadecylammonium chloride), then the solution is homogenized for 5 minutes at ambient temperature. The color changes from light green to dark yellow and then to brown. After homogenization, 483.0 mg (2 mmol) of HDA (hexadecylamine) are added. The reaction medium thus formed is heated at 150° C. for 2 days. The black powder formed is recovered by magnetic settling and washed 5 times with toluene (5×15 ml). Transition electron microscopy (TEM) correlated to x-ray diffraction shows the formation of purely metallic Fe(0) nanoparticles of somewhat cubic shape (presented in FIG. 2).

The Curie temperature of the material is Tc=1043 K. The anisotropy of the iron nanoparticles is estimated at K=$7 \times 10^4$ J/m$^3$, with N=88.5, the diameter D=10.8 nm with a standard deviation of 0.9 nm.

EXAMPLE 3

Fischer-Tropsch Catalysis by Fe(0) Nanoparticles

A Fisher-Porter bottle is loaded under an argon atmosphere with around 10 mg of Fe(0) nanoparticles obtained in example 2. After having created a vacuum in the bottle, the latter is pressurized at ambient temperature with an equivalent amount of CO and $H_2$ bringing the pressure of the system to 1.85 bar of gas. The pressure of the system is controlled using a manometer placed over the top of the Fisher-Porter bottle. The body of the bottle is then placed inside a coil which generates an alternating magnetic field having a frequency of 60 kHz and an amplitude of 56 mT (28 A) for a duration of 2×30 min (and a waiting time between the two of 10 min). The rise in temperature is rapid.

Figure 3:
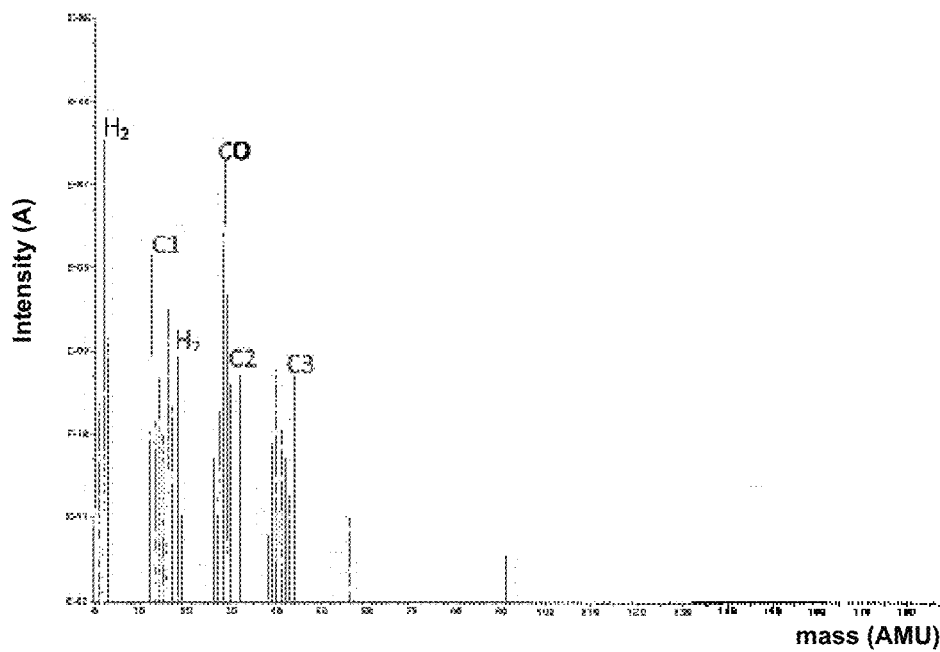
FIG. 3 is the mass spectrum of the products of a Fischer-Tropsch reaction catalyzed by iron nanoparticles according to the invention.

At the end of the reaction, the gas contained in the bottle is analyzed by mass spectrometry. The conversion of the gas added is complete. The analysis of the spectrum shows the presence of hydrocarbons ranging from C1 to C3, residual CO and $H_2$ and the presence of water (see FIG. 3).

EXAMPLE 4

Synthesis of Fe/FeC/Ru Nanoparticulate Catalysts

A glass Fisher-Porter bottle was used as reactor. It is loaded in a glovebox with a solution of 376.5 mg (1 mmol) of $\{Fe[N(SiMe_3)_2]_2\}_2$ iron complex dimer in 20 ml of mesitylene. Added to this solution are 415.5 mg (i.e. 1.5 mmol) of HDAHCl (hexadecylammonium chloride), then the solution is homogenized for 5 minutes at ambient temperature. The color changes from light green to dark yellow and then to brown. After homogenization, 483.0 mg (2 mmol) of HDA (hexadecylamine) are added. The reaction medium thus formed is heated at 150° C. for 2 days. Added to this solution are 42.6 mg (0.066 mmol) of $Ru_3(CO)_{12}$ and the reaction medium is again homogenized under magnetic stirring for 30 minutes at 90° C. Next, the solution is pressurized at ambient temperature for 10 minutes at 3 bar of hydrogen. It is then heated at 150° C. for 24 h. The black powder formed is recovered by magnetic settling and washed 5 times with toluene (5×15 ml).

The various methods of transmission electron microscopy (TEM, HRTEM, STEM and EDX), correlated to x-ray diffraction, indicate the formation of core-shell type nanoparticles of spherical shape, comprising an Fe(0) core of around 10.0 nm (±0.9 nm), and a polycrystalline shell of around 0.5 nm of iron carbides doped with 5% to 7% of ruthenium.

The anisotropy of the nanoparticles thus obtained is estimated at around $5.5 \times 10^4$ J/m$^3$ for the FeC particles. The diameter of the particles D=11.6 nm with a standard deviation of 0.9 nm. The initial Curie temperature of the material is Tc=1043 K. The anisotropy of the FeC nanoparticles is estimated at $K=5.5 \times 10^4$ J/m$^3$, N=84.2 and D=11.6 nm (±0.9 nm).

EXAMPLE 5

Hyperthermia Properties

The heat dissipated by the nanoparticles obtained in example 4 when they are placed in an alternating magnetic field is determined, in order to demonstrate their hyperthermia properties. Studies of the hyperthermia properties (SAR=power dissipated) of a system of ferromagnetic nanoparticles may be carried out by measuring the increase in the temperature of the nanoparticles under the effect of an alternating magnetic field. In order to do this, we have developed a hyperthermia measurement bench, which operates in a relatively broad range of sinusoidal magnetic field having an amplitude that varies from 0-60 mT and having a frequency of 2-100 kHz.

A vial containing around 10 mg of nanoparticle powder obtained in example 3, prepared under an inert atmosphere to avoid any oxidation, is placed in a calorimeter containing 1.5 ml of water. The temperature of the water is measured by using a fiber optic temperature sensor. The measurement time is chosen at between 30 s and 100 s, as a function of the experimental parameters, so that the rise in temperature never exceeds 20° C. The rise in temperature at the end of the application of the magnetic field is measured after stirring the calorimeter to ensure the homogeneity of the temperature. The power dissipated (SAR) by the nanoparticles is then calculated, according to the formula:

$$SAR = \frac{\sum_i C_{pi} m_i}{m_{Fe}} \frac{\Delta T}{\Delta t}$$

where $C_{pi}$ and $m_i$ are respectively the specific heat capacities and the masses of each component ($C_p$=449 J·kg$^{-1}$·K$^{-1}$ for the Fe nanoparticles, $C_p$=1750 J·kg$^{-1}$·K$^{-1}$ for mesitylene, $C_p$=4186 J·kg$^{-1}$·K$^{-1}$ for water and $C_p$=720 J·kg$^{-1}$·K$^{-1}$ for glass). The denominator $m_{Fe}$ is the metallic mass of the sample.

The value of the SAR obtained at 54 KHz for the Fe/FeC/Ru nanoparticles described above is 250 W·g$^{-1}$, power sufficient to attain the temperatures necessary for the catalysis.

EXAMPLE 6

Activation of CO by $H_2$ by Fe—FeC—Ru Nanoparticles

Figure 4:
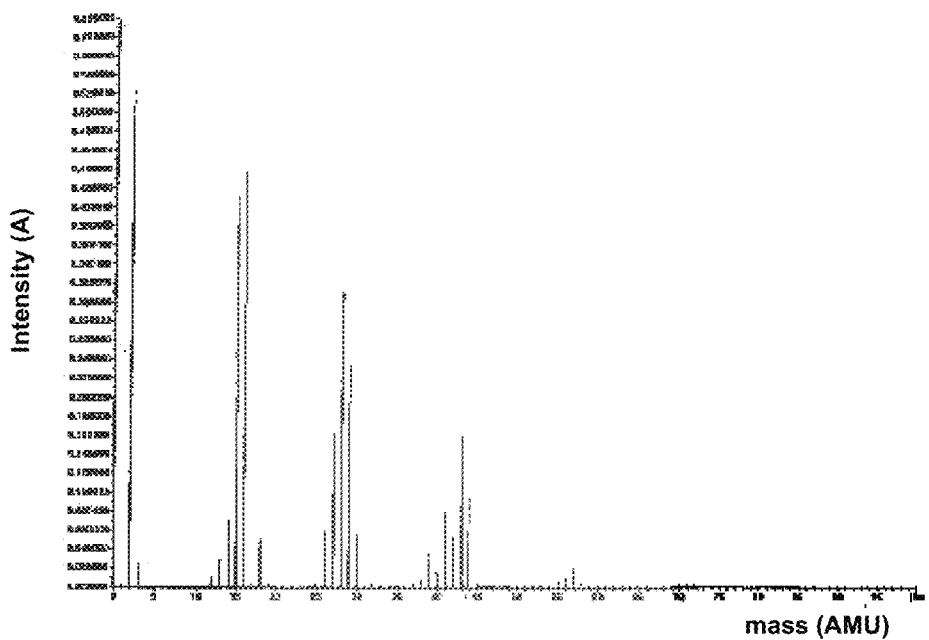
FIG. 4 is the mass spectrum of the products of a reaction for activation of CO by $H_2$, catalyzed by Fe/FeC/Ru nanoparticles according to the invention.

A glass Fisher-Porter bottle is loaded in a glovebox with around 10 mg of Fe/FeC/Ru nanoparticulate catalyst obtained in example 4. After having created a vacuum in the bottle, the latter is pressurized at ambient temperature with 1 bar of carbon monoxide and 4 bar of dihydrogen, bringing the pressure of the system to 5 bar of gas. The pressure of the system is controlled using a manometer placed over the top of the Fisher-Porter bottle. The body of the bottle is then placed inside the coil which generates the alternating magnetic field having a frequency of 60 kHz and an amplitude of 56 mT (28 A) for a duration of 5 h. The pressure inside the bottle reaches 2.1 bar at the end of the experiment, i.e. a loss of 3 bar. At the end of the reaction, the gas contained in the bottle is analyzed by mass spectrometry. The analysis of the spectrum shows the presence of hydrocarbons ranging from C1 to C4-C5, residual CO and $H_2$ and the presence of water (FIG. 4).

Figure 5:
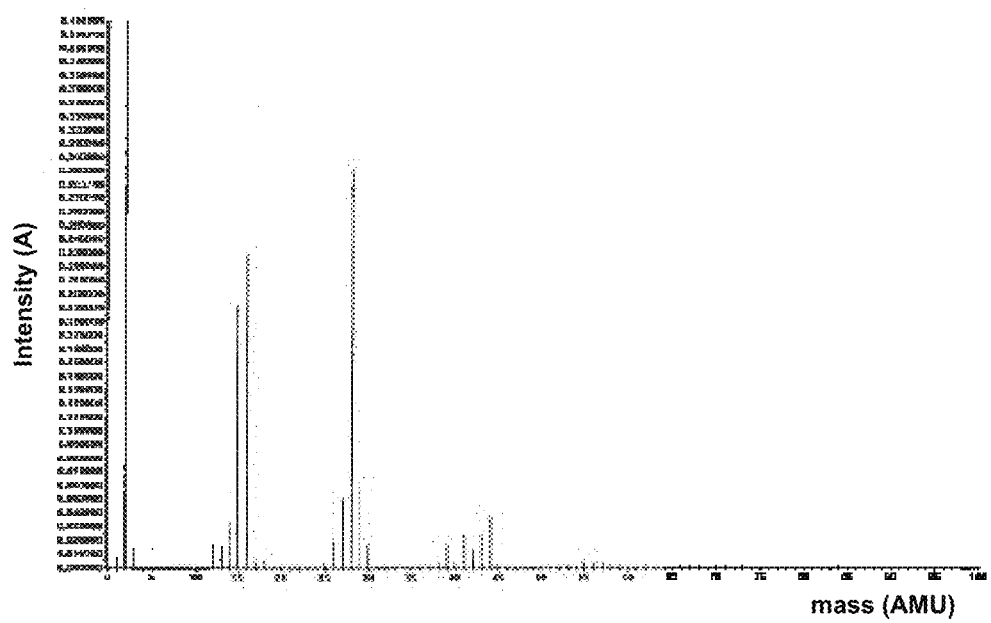
FIGS. 5 and 6 are mass spectra of the products obtained after a second and third reaction for activation of CO by $H_2$, catalyzed by the same Fe/FeC/Ru nanoparticles.
Figure 6:
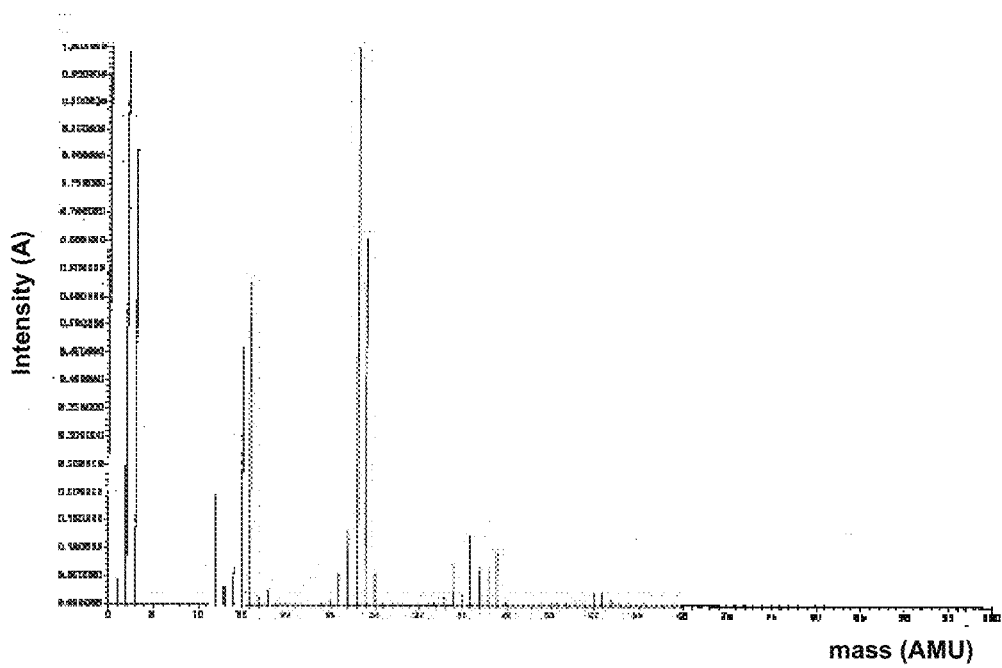

It is interesting to note that after the first experiment, the catalyst has been recycled and tested again under the same conditions. After 3 h of magnetic heating, a pressure loss of 2 bar (compared to 3 bar previously) and the formation again of hydrocarbons ranging from C1 to C4 (FIG. 5) are noted. The second recycling of the catalyst results in a loss of only 1 bar after 3 h of reaction and formation of hydrocarbons ranging from C1 to C3 (FIG. 6).

It is thus verified that after the first catalytic cycle, the ferromagnetic and catalytic nanoparticles are still active. A layer of carbon is obtained and the catalyst is not killed. The catalyst is still living, and it can be recycled.

EXAMPLE 7

Fischer-Tropsch Catalysis by Fe(0) Nanoparticles

A glass Fisher-Porter bottle is loaded under an argon atmosphere with around 10 mg of Fe/FeC/Ru nanoparticles obtained in example 4. After having created a vacuum in the bottle, the latter is pressurized at ambient temperature with an equivalent amount of $CO_2$ and $H_2$, bringing the pressure of the system to 4 bar of gas. The pressure of the system is controlled using a manometer placed over the top of the Fisher-Porter bottle. The body of the bottle is then placed inside a coil which generates an alternating magnetic field having a frequency of 300 kHz and an amplitude of 80 mT for a duration of 4 h.

Figure 7:
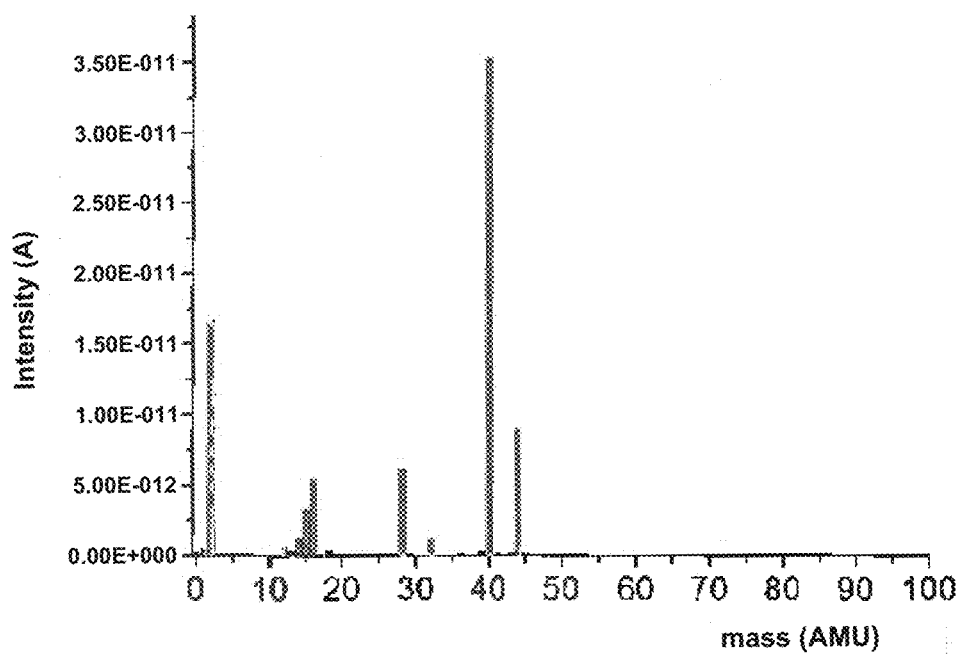
FIG. 7 is the mass spectrum of the products of a reaction for activation of $CO_2$ by $H_2$ catalyzed by Fe/FeC/Ru nanoparticles according to the invention.

At the end of the reaction, the gas contained in the bottle is analyzed by mass spectrometry. The conversion of the gas added is complete. The analysis of the spectrum shows the presence of methane ($CH_4$), residual CO and $H_2$ and also the presence of water (see FIG. 7).

The invention claimed is:

1. A process for the gas-solid heterogeneous catalysis of a chemical reaction of conversion of a carbon oxide, using, in a reactor, at least one reactant in a gaseous state and a solid catalytic composition for catalyzing said reaction in a given range of temperatures T, the process comprising:
bringing said at least one reactant into contact with said catalytic composition, said catalytic composition comprising a ferromagnetic nanoparticulate component, the surface of which consists, at least partly, of a compound that is a catalyst for said chemical reaction,
heating said nanoparticulate component by magnetic induction in order to reach a temperature within said range of temperatures T, and
recovering the reaction product(s) that are formed at the surface of said nanoparticulate component.

2. The process according to claim 1, wherein said nanoparticulate component is heated by magnetic induction using a field inductor external to the reactor.

3. The process according to claim 1, wherein the magnetic field generated by induction has an amplitude of between 1 mT and 100 mT, and a frequency of between 20 kHz and 400 kHz.

4. The process according to claim 1, wherein said nanoparticulate component consists of at least one ferromagnetic metal compound which is also a catalyst for said chemical reaction.

5. The process according to claim 1, wherein said nanoparticulate component consists of at least one ferromagnetic metal compound that forms a core which is associated with a catalytic metal for said chemical reaction.

6. The process according to claim 4, wherein said ferromagnetic metal compound has a magnetic anisotropy of less than $8 \times 10^4$ $J \cdot m^{-3}$.

7. The process according to claim 1, wherein the size of said ferromagnetic nanoparticulate component is such that the diameter D of said ferromagnetic nanoparticulate component, expressed in nanometers, is defined by the relationship:

$$D = N\sqrt{\frac{T_C}{K}}$$

where $80 \leq N \leq 200$,
$T_C$ is the Curie temperature of the ferromagnetic material in Kelvin, and
K is the magnetic anisotropy of the ferromagnetic nanoparticulate component in $J \cdot m^{-3}$.

8. The process according to claim 1, wherein the size of said ferromagnetic nanoparticulate component is between 5 nm and 50 nm.

9. The process according to claim 4, wherein said at least one ferromagnetic compound which is also a catalyst is selected from the group consisting of iron, cobalt, nickel, and oxides, carbides and alloys thereof.

10. The process according to claim 5, wherein said at least one ferromagnetic metal compound that forms a core is selected from the group consisting of iron and iron carbides, and said catalytic metal is completely or partly covering said core and is selected from the group consisting of ruthenium, manganese, cobalt, nickel, copper and zinc.

11. The process according to claim 1, wherein said reactor is manufactured from non-ferromagnetic materials.

12. The process according to claim 1, wherein said chemical reaction is a reaction for synthesizing a hydrocarbon by gas-solid catalysis.

13. The process according to claim 1, wherein said chemical reaction is a hydrogenation reaction of a carbon oxide in the gaseous state, catalyzed by nanoparticles heated by magnetic induction.

14. The process according to claim 1, wherein said ferromagnetic nanoparticulate component comprises at least a ferromagnetic metal compound selected from the group consisting of iron and iron carbides.

* * * * *